Figure 1:
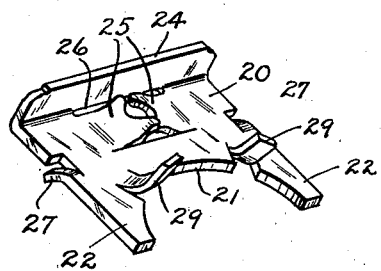

Aug. 7, 1945.  G. A. TINNERMAN  2,381,144
FASTENING DEVICE
Filed Oct. 30, 1943

INVENTOR.
GEORGE A. TINNERMAN
BY
Bates, Teare, & McBean
ATTORNEYS

Patented Aug. 7, 1945

2,381,144

UNITED STATES PATENT OFFICE 2,381,144

FASTENING DEVICE

George A. Tinnerman, Cleveland, Ohio, assignor to Tinnerman Products, Inc., Cleveland, Ohio, a corporation of Ohio Application October 30, 1943, Serial No. 508,345

6 Claims. (Cl. 85—36)

This invention is concerned with a fastening device adapted to be mounted on a flange of an article to be secured and provide such flange with a nut, so that the article is placed in condition for immediate attachment by the insertion of the fastening screw or bolt. An object of the invention is to provide such fastening device in a form which may be mounted entirely on one face of the flange and still will hold itself effectively in position, thus leaving the other face of the flange free so that it may abut directly against a support to which the article is to be attached.

Another object of the invention is to provide such fastening device in the form enabling it to be readily mounted in a snapping manner by the mere action of pushing the fastener into place on the flange and into engagement with the article.

Another object of my invention is to provide a fastening device which may be readily made from a single integral piece of resilient sheet metal into a form which has a body portion with deformed metal about a bolt opening to provide a thread-engager, and has a retaining edge adapted to coact with the article, and is further provided with a spring tongue to engage the article and a shoulder to coact with the flange. The parts are so arranged that the reaction of the tongue against the article maintains the shoulder in coaction with the flange, the result being that, while the fastener may be very readily put into place by a snapping action, it will be automatically held in position ready to receive the threaded member.

My fastener is adapted for coaction with an article having a fastening plate extending across one side, the fastening device lying against that side of the plate which is adjacent the article and coacting both with the article and the plate to hold itself in position and provide a nut for the screw or bolt passing through the plate.

My invention is especially well adapted for co-operation with a commercial form of electric switch which has an elongated case and a face plate permanently secured to the case and overhanging the ends thereof. The switch body is normally slightly undercut or rounded where it joins the face plate, which leaves a recess between the body and face plate just under the ends of the body, and the face plate is normally provided with notches in its opposite edges for the passage of securing screws. In my fastener, I avail myself of the underhanging recess and the edge notches in the face plate by forming the fastener with a portion to extend into the recess and with lugs to extend into the notches and I provide the fastener with a spring tongue which may press against the body of the switch.

It results from this mutual formation of switch and fastener that when the fastener rests on the surface of the face plate adjacent the switch, if it is shoved into the slight recess between the body and face plate the spring tongue will engage the body while the lugs will pass into the arcuate openings, and the spring tongue pressing the fastener outwardly will force the lugs tightly against the outer walls of the notches so that the fastener is held snugly against the overhanging portion of the face plate.

The face plate has originally or is formed with a central opening through its overhanging portion, and the fastener has a registering opening, with the material of the fastener deformed about its opening to provide a thread-engager. The result is that the mere shoving of the fastener into position on the face plate of the article provides the article with a nut definitely held in position and ready to receive the fastening screw.

Electric switches of the character above referred to are frequently used in sets each one abutting the side of the adjacent one. My fastener is adapted for use on such switches as it need not extend laterally beyond the face plate of the switch and hence need not interfere with the normal close mounting of a plurality of switches.

The drawing illustrates my fastener both detached and as mounted on the face plate of a commercial electric switch above described.

Figure 2:
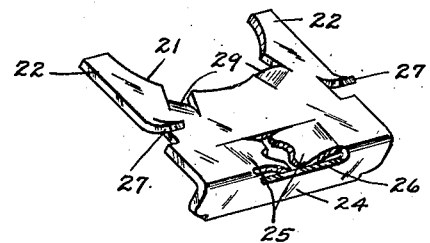
Figure 3:
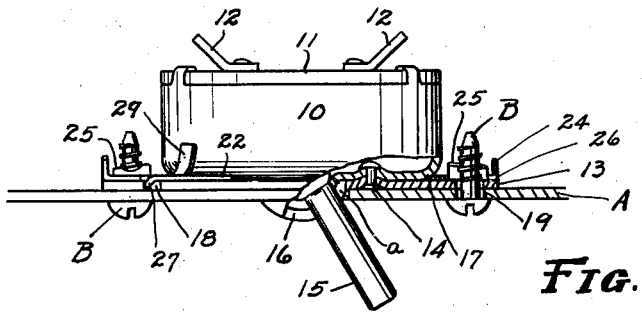
Figure 4:
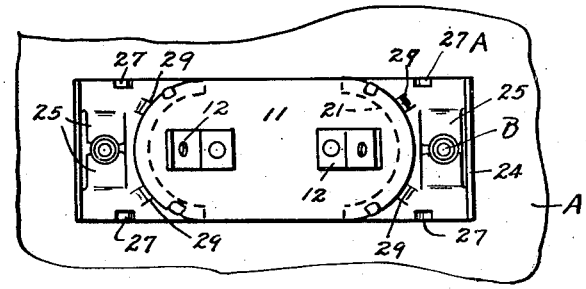

In the drawing, Fig. 1 is a perspective looking at what may be called the upper face of the fastener; Fig. 2 is a perspective looking at the underface; Fig. 3 is a sectional side elevation of a mounted electric switch having two of my fasteners providing nuts for the fastening screws; Fig. 4 is a plan of the switch and fastener shown in Fig. 3.

In Fig. 2, 10 designates the metallic casing of a commercial electric switch and 11 an insulating closure plate therefor carrying contact terminals 12. 13 indicates the face plate of the switch which is shown as riveted at 14 to the casing 10. 15 indicates the operating lever of the switch which extends through a slot 16 in a spherical boss on the face plate.

It will be seen that the bottom and wall of the switch constitutes an integral cup-shaped member of elongated form with rounded ends, the wall joining the bottom by a natural curve as shown at 17 in Fig. 3. The face plate is provided with edge notches 18, which may be normally availed of for the passage of attaching devices especially where a plurality of switch devices stand side by side. The face plate 13 is either normally provided with a hole 19 for the passage of a single screw for that end of the fastener or such hole is formed as a preliminary to the employment of my fastener.

I have described in detail the commercial switch shown, because the particular form of fastener shown in Figs. 1 and 2 is designed to cooperate with the characteristics of such switch and its overhanging face plate. However, slight changes in shape or dimensions would provide a fastener readily suitable for fastening various other articles having fastening flanges on which it is desired to provide nuts.

My fastener, as shown in Figs. 1 and 2, is a single piece of resilient sheet material, preferably spring steel, which is cut and bent and provides the following elements; namely: flat body 20, parallel-sided and provided with an approximately semi-circular notch 21 in one end which leaves two legs 22 at the extreme end. Partially severed from the body and turned up at an angle thereto is a pair of tongues 23 which extend upwardly and somewhat outwardly adjacent the curved end.

At the other end the body is bent upwardly at a right angle to provide a short flange 24. From the plate portion of the body I form a pair of tongues 25 partially severed at the side edges from the body anchored to the body at their distant ends and bent obliquely upwardly and warped in opposite directions at their free ends. These free ends are notched and spaced apart so that these tongues define one turn of a helical thread corresponding to the thread of a bolt or screw to be used. The slit 26 along one edge of the tongues provides also the line of bend of the flange 24 so that part of the slit lies in the base plane of the fastener and part in the lower edge of the flange, as illustrated in Fig. 2.

In the edges of the body, I provide two lugs 27 which are severed from the body at the end of the lug adjacent the flange 24 and along the inside of the lug but anchored to the body at the end adjacent the legs 22. These lugs are thus inclined downwardly toward the end of the body having the flange.

I also provide a pair of tongues 29 which are partially severed from the body and bent upwardly at an angle thereto. These tongues, if flat, would extend into the semi-circular notch 21; that is, the outer portion of the tongues is made from the material removed to make that notch. The tongues are bent up nearly but not quite to a right angle with the flat body 20.

In mounting my fastener it is merely placed on the overhanging face plate and shoved toward the body of the switch by pressure against the outer face of the flange 24. This causes the end of the fastener having the legs 22 to pass into the arcuate space between the switch casing and plate, the innermost end of the fastener being indicated by the dotted line 21 in Fig. 4. In coming into this position, the lugs 27 run along the face plate and snap into the notches 18 thereof, usually provided therein for the passage of attaching devices. The tongues 29 engaging the switch casing become bent into a more nearly upright position and by spring reaction tend to push the fastener outwardly. This causes the lugs 27 to bear under pressure against the outer edges of the notches 18.

It results from the fastener underhanging the switch casing and from the spring tongues tending to push it outwardly and the lugs stopping such movement, that the fastener when put in place firmly holds itself in position. In this position the opening between the warped tongues 25 registers with the opening 19 through the face plate 15 so that the switch is provided with nuts held in place thereon and enabling the mounting to be effected by mere insertion of screws.

In Figs. 3 and 4, I have indicated at A a supporting plate to which the equipped switch described is intended to be mounted. Since my fastener lies entirely on that face of the attaching plate which is adjacent the switch body, the other face of the attaching plate is left flat, or in its normal condition, so that it may be readily held against the supporting plate A. Such supporting plate is provided with an opening a for the passage of the operating lever and the boss on the attaching plate. Fig. 3 indicates screws B passing through the plate A and through the opening of the attaching plate and finding their nuts by means of my fastening devices.

It will be seen from Figs. 3 and 4 that my fastening device occupies merely waste space at the back of the switch face plate and when it is in place the side edges of the fastener are practically coincident with the side edges of the face plate and the extreme outer end of the fastener is coincident with the end of the face plate.

At any time it may be desired to remove the fastener from the face plate of an unmounted switch it is simply necessary to insert a blade between them and spring the fastener loose. The portion of the slit 26 in the flange 24 furnishes a convenient space for the insertion of such blade.

It will be seen that my fastener is a simple device adapted for very quick mounting on the article for which it is intended and at once providing that article with a fastening nut. This enables the article to be mounted in a very quick manner without requiring the need of a wrench and merely by inserting screws from the front. This reduction in the time required for mounting the switch has been found of great value, for instance, in airplane manufacture where a large number of electric switches are employed.

I claim:

1. A sheet metal nut adapted for automatic attachment to a body having a face plate, said nut having a portion adapted to rest on the face plate and having a recess in its end for receiving the body, a spring tongue turned upwardly from the nut adjacent the recess and a lug turned downwardly from the nut.

2. A sheet metal nut adapted for automatic attachment to a body having a face plate, said nut having a portion adapted to rest on the face plate and having deformed material to provide a thread-engager about a bolt opening, a pair of spring tongues turned upwardly from said portion back of its adjacent end for receiving the body.

3. A sheet metal nut having a body portion with a recess in its end for receiving the body, a pair of spring tongues turned upwardly from the body portion back of the edge of the recess, and a pair of edge lugs turned downwardly from the body portion, said body portion being slitted to produce a pair of opposed tongues which are tipped from the plane of the body into an oblique position and are separated and warped at their ends to provide a thread-engager.

4. A sheet metal nut having a body portion, a spring tongue turned upwardly from the body portion, a lug turned downwardly from the body portion, said body portion being slitted to produce a pair of opposed tongues which are tipped from the plane of the body into an oblique position and are separated and warped at their ends to provide a thread-engager, the end portion of the nut being bent upwardly to provide a brace connecting the anchored portions of the oblique tongues.

5. A sheet metal nut adapted for automatic attachment to a body having an overhanging plate, said nut having a portion adapted to rest on the overhanging portion of the plate and having a recess in its end for receiving the body, a pair of spring tongues turned upwardly from the nut back of the recess and a pair of edge lugs turned downwardly from the nut, the body of the nut being slitted to produce a pair of opposed tongues which are tipped from the plane of the body into an oblique position and are separated and warped at their ends to provide thread engagement, and the end portion of the nut being bent upwardly to provide a brace connecting the anchored portions of said oblique tongues.

6. A sheet metal nut adapted for automatic attachment to a body having a face plate, said nut having a portion adapted to rest on the face plate and engage the body and having deformed material on its upper face to provide a thread-engager and a pair of lugs turned downwardly from the nut at the opposite side edges thereof.

GEORGE A. TINNERMAN.